United States Patent
Li et al.

(10) Patent No.: US 9,122,332 B2
(45) Date of Patent: Sep. 1, 2015

(54) AUTOMATIC DETECTION FOR TOUCH THROUGH GLOVE

(71) Applicant: CELLCO PARTNERSHIP, Basking Ridge, NJ (US)

(72) Inventors: Yuk Lun Li, Morganville, NJ (US); Xin Ren, Warren, NJ (US); John Chin, Upper Montclair, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 185 days.

(21) Appl. No.: 13/843,346

(22) Filed: Mar. 15, 2013

(65) Prior Publication Data
US 2014/0267085 A1    Sep. 18, 2014

(51) Int. Cl.
*G06F 3/041* (2006.01)
(52) U.S. Cl.
CPC ..................................... *G06F 3/041* (2013.01)
(58) Field of Classification Search
CPC ....................................................... G06F 3/041
USPC ............................................................ 345/173
See application file for complete search history.

(56) References Cited

U.S. PATENT DOCUMENTS

| | | | |
|---|---|---|---|
| 2011/0163955 A1* | 7/2011 | Nasiri et al. | 345/158 |
| 2012/0268411 A1* | 10/2012 | Chen et al. | 345/174 |
| 2013/0033433 A1* | 2/2013 | Rogers et al. | 345/173 |
| 2014/0002408 A1* | 1/2014 | Abbate et al. | 345/174 |

* cited by examiner

*Primary Examiner* — Charles V Hicks (57) ABSTRACT

Aspects of the subject technology relate to a device including a touch-screen configured to detect user engagement with a surface of the touch-screen and output one or more signals corresponding with the user touch engagement. In certain aspects, the device further includes a touch sense controller coupled to the touch-screen, wherein the touch sense controller is configured to receive the one or more signals corresponding with the user engagement and to determine a mode of user engagement with the surface of the touch-screen based on the one or more signals. A method and touch sense controller are also provided.

21 Claims, 5 Drawing Sheets

AUTOMATIC DETECTION FOR TOUCH THROUGH GLOVE

BACKGROUND

In recent years, the use of touch-screens in consumer electronic devices, such as smart phones and tablet computers, has greatly increased. One limitation of older touch-screen technologies is that a user's engagement with the touch-screen must involve direct contact between the user (e.g., the user's finger/s) and a surface of the touch-screen. Recently, touch-screen controllers have become available that allow a 'high-sensitivity' mode that can enable a user's engagement with the touch-screen to be registered through a material or fabric, such as a glove. However, such controllers must be manually toggled between 'high-sensitivity' modes (e.g., for gloved operation) and 'low-sensitivity' modes (e.g., for ungloved operation). The manual nature by which the touch-screen controller must be toggled is detrimental to the user experience because it requires that a user first remove his/her glove to place the screen in a 'high-sensitivity mode.' Furthermore, power consumption of the controller and/or host device is generally greater when a touch-screen is placed in a 'high-sensitivity' mode, thus, if the user should forget to re-enter the 'low-sensitivity' mode, for example if gloved operation is no longer desired, the battery life of the host device may be adversely affected.

Hence a need exists for a way to determine a suitable sensitivity mode, and to automatically select a sensitivity mode based on an optimal sensitivity setting, without the need for a manual user selection.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings can be practiced without such details. In other instances, well known methods, procedures, components, and/or circuitry have been described at a relatively high-level, without detail, in order to avoid unnecessarily obscuring aspects of the present teachings.

Aspects of the disclosed subject matter provide systems and methods for automatically selecting a sensitivity mode associated with a touch-based display. In particular, the subject technology relates to a user interface (UI) that is capable of detecting a user's interaction with a touch-screen and determining the type (mode) of the user's interaction (e.g., gloved or ungloved). Aspects of the UI further include features for automatically selecting a sensitivity mode corresponding with the user interaction. For example, aspects of the subject technology can include the automatic selection of a 'high-sensitivity' mode, corresponding with gloved user interaction, and a 'low-sensitivity' mode, corresponding with ungloved user interaction.

Implementations of the subject technology can be realized using a touch sense controller and driver software for detecting a mode of user interaction (i.e., gloved or ungloved), and for automatically adjusting corresponding sensitivity parameters of a touch-screen, touch sense controller, and/or signal processing modules or circuits of a corresponding host device. The determination as to whether a particular user interaction with a touch-screen occurs with or without a glove can be based on a comparison of a user's interaction with the touch-screen to a model. In certain aspects, the model may be a heuristic model that is based on data collected for a particular user, and/or historical data aggregated for one or more users.

Although heuristic data can include a variety of data types (and sources), in some implementations the heuristic data can include data representing (1) capacitive changes associated with a user's interaction with a display surface, (2) changes in contact area between a user and the display surface (e.g., gloved fingers generally contact the display surface along a greater surface area), and/or (3) acoustic properties of the interaction (e.g., measuring changes/differences in sounds produced as a user engages a display surface with (or without) gloves. A UI of the subject technology can also include features for manually overriding the ability of a touch sense controller to automatically switch between gloved/ungloved modes. For example, a UI of the subject technology can include features for allowing the user to manually override the automatic selection of a sensitivity setting (e.g., to turn 'off' an automatic selection feature), or to manually toggle from a high-sensitivity setting to a low-sensitivity setting, and vice versa.

The various examples discussed below enable automatic toggling of a touch-based display between different sensitivity modes. Gloved and ungloved user interactions with a touch-screen are detected, and a device with the touch-screen will automatically switch between a 'high-sensitivity' mode (e.g., for gloved user interaction), and a 'low-sensitivity' mode (e.g., for ungloved user interaction).

Figure 1A:
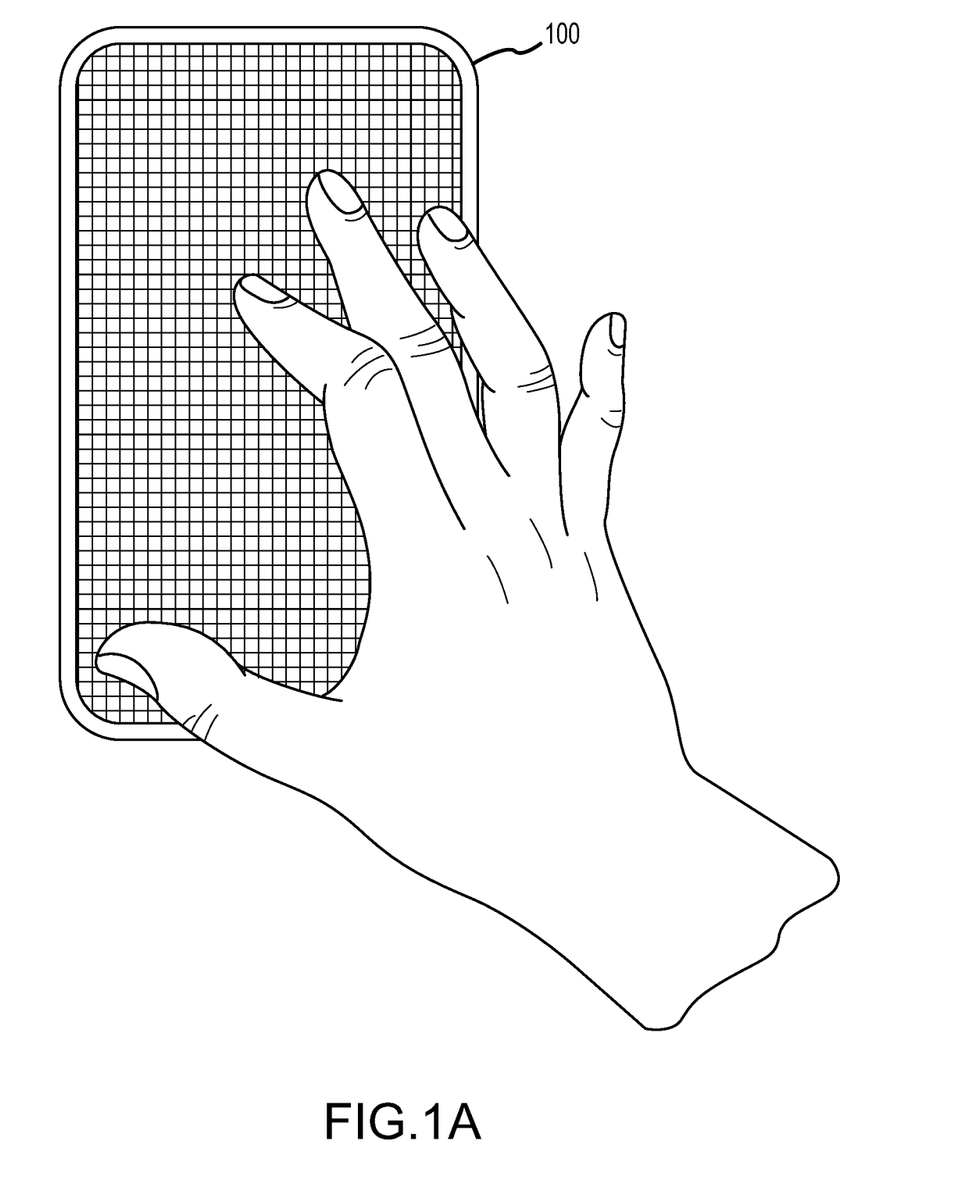
FIGS. 1A and 1B illustrate examples of user touch interaction with a touch-screen, according to some aspects of the subject technology.
Figure 1B:
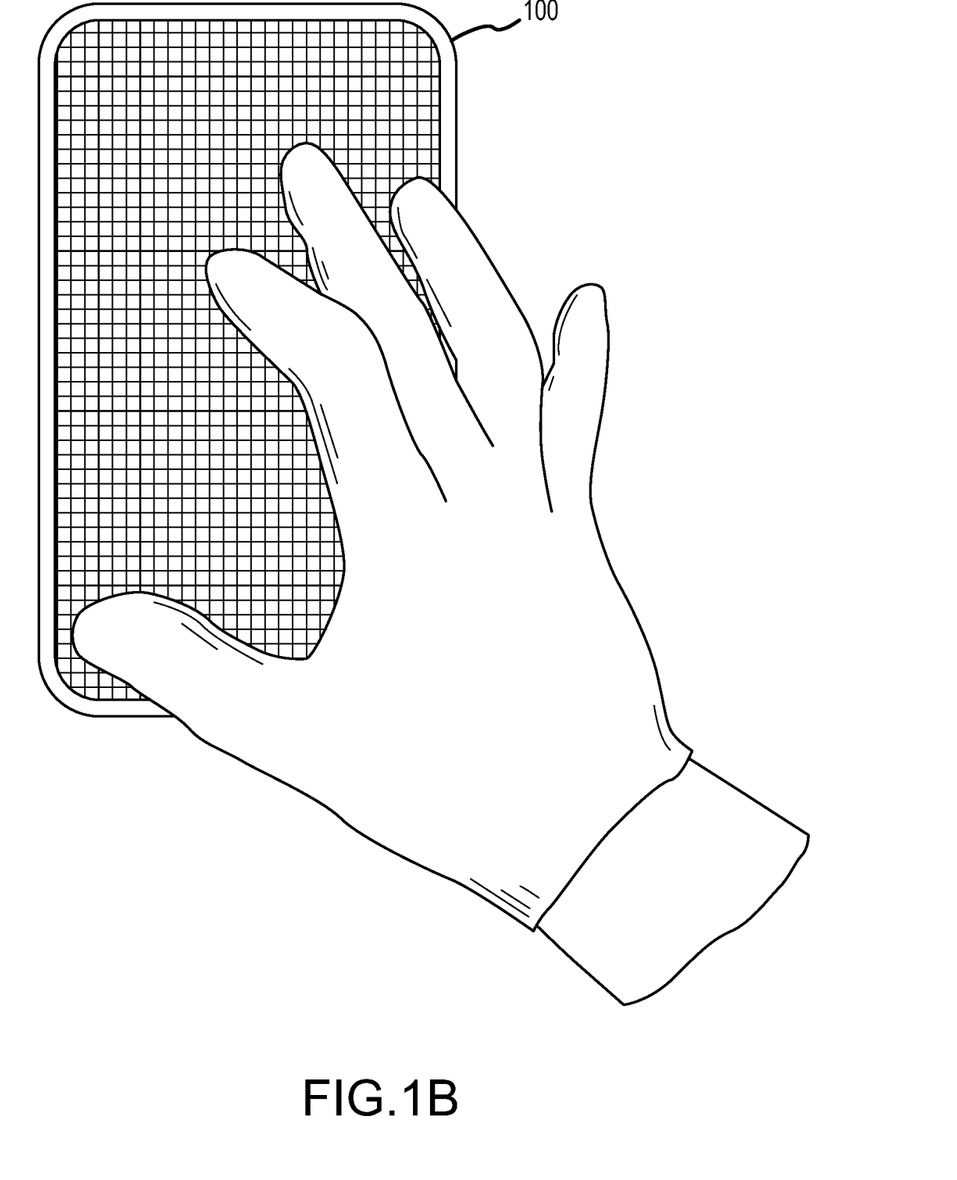

Reference now is made in detail to the examples illustrated in the accompanying drawings and discussed below. FIGS. 1A and 1B illustrate examples of different types of user touch interaction that can occur with respect to a touch-screen. As described in further detail below, touch-screen 100 can include any type of touch-based display, such as a capacitive touch display, capable of receiving inputs via a user touch interaction.

For some touch-screen devices, capacitive changes on the screen's surface (e.g., resulting from user touch interactions) can be used determine a location on the screen's surface corresponding of the user's touch interaction. For example, capacitive changes can cause signals to be provided to a touch sense controller and used to determine where and how the user is interfacing with a surface of the touch-screen. According to aspects of the subject technology, such signals can be used to detect whether or not a user's interaction with the touch-screen occurs through a glove.

In some implementations, capacitive changes registered by the touch-screen are influenced by the electrical properties of the contacting object, such as, a user's hand, stylus or other object. As such, capacitive changes resulting from a user's touch interaction can depend on the ways in which a user interacts with the touch-screen. For example, a user's engagement with the surface of the touch-screen can occur using a bare hand, as depicted in FIG. 1A, or through a fabric or other material, such as a glove, as depicted in FIG. 1B. In some instances, interactions that occur through materials of lower electrical conductivity, such as cloth or fabric, will result in smaller degrees of capacitive disturbance at the touch screen surface. Accordingly, such interactions can be more difficult to detect as compared to interactions which occur using a materials having a relatively higher electrical conductivity, such as, interaction between the touch-screen surface and the user's bare hand/fingers or a stylus, etc.

As such, for gloved user interactions, it can be desirable to increase a sensitivity of the touch sense controller used to receive and process signals associated with capacitive changes resulting from user touch interactions. Conversely, for ungloved user interactions, the desired sensitivity of the touch sense controller can be relatively lower than that for gloved user interactions.

An increased sensitivity of the touch sense controller (e.g., a high-sensitivity mode of the touch sense controller) can correspond with changes in the electrical properties of the touch sense controller/touch-screen and/or changes in the signal processing and filtering performed by the touch sense controller and/or one or more microcontroller/s and/or processor/s of the host device. For example, a high-sensitivity mode can correspond with an increase in the voltage provided to the touch-screen, as well as an increase in the amount of processing/filtering performed by the touch sense controller (and/or one or more processors) on signals representing user touch interaction with the touch-screen surface. Thus, in some implementations, a high-sensitivity mode can consume a greater amount of power, as compared to a low-sensitivity mode.

In practice, a touch sense controller may be optimally placed in a 'low-sensitivity' mode for the user touch interaction depicted in FIG. 1A, wherein the user's hand is directly in contact with a surface of touch-screen 100 (e.g., during ungloved user interaction). Likewise, the touch-sense controller may be more optimally placed in a 'high-sensitivity' mode for the user touch interaction depicted in FIG. 1B, wherein the user's contact with surface occurs through a glove.

To improve the overall user interaction with a host device (e.g., that includes the touch-screen), it is desirable to detect a user's interaction with the touch-screen, and automatically determine and select a proper sensitivity setting with respect to the touch sense controller. Although aspects of the technology refer to the ability to select between a 'high-sensitivity' mode and a 'low-sensitivity' mode, it is understood that a sensitivity selection may be made from among a greater number of sensitivity modes or levels without departing from the scope of the subject technology.

By detecting and automatically selecting a sensitivity mode based on the user's interaction with the touch-screen, the touch-screen can be conveniently and automatically switched between a gloved user interaction mode and an ungloved user interaction mode, without the need of the user to manually switch between sensitivity modes. Additionally, because some sensitivity settings may consume more power than others, the ability to automatically select an appropriate sensitivity setting can improve power consumption of a host device by ensuring that power-greedy sensitivity settings are not used unnecessarily.

Figure 2:
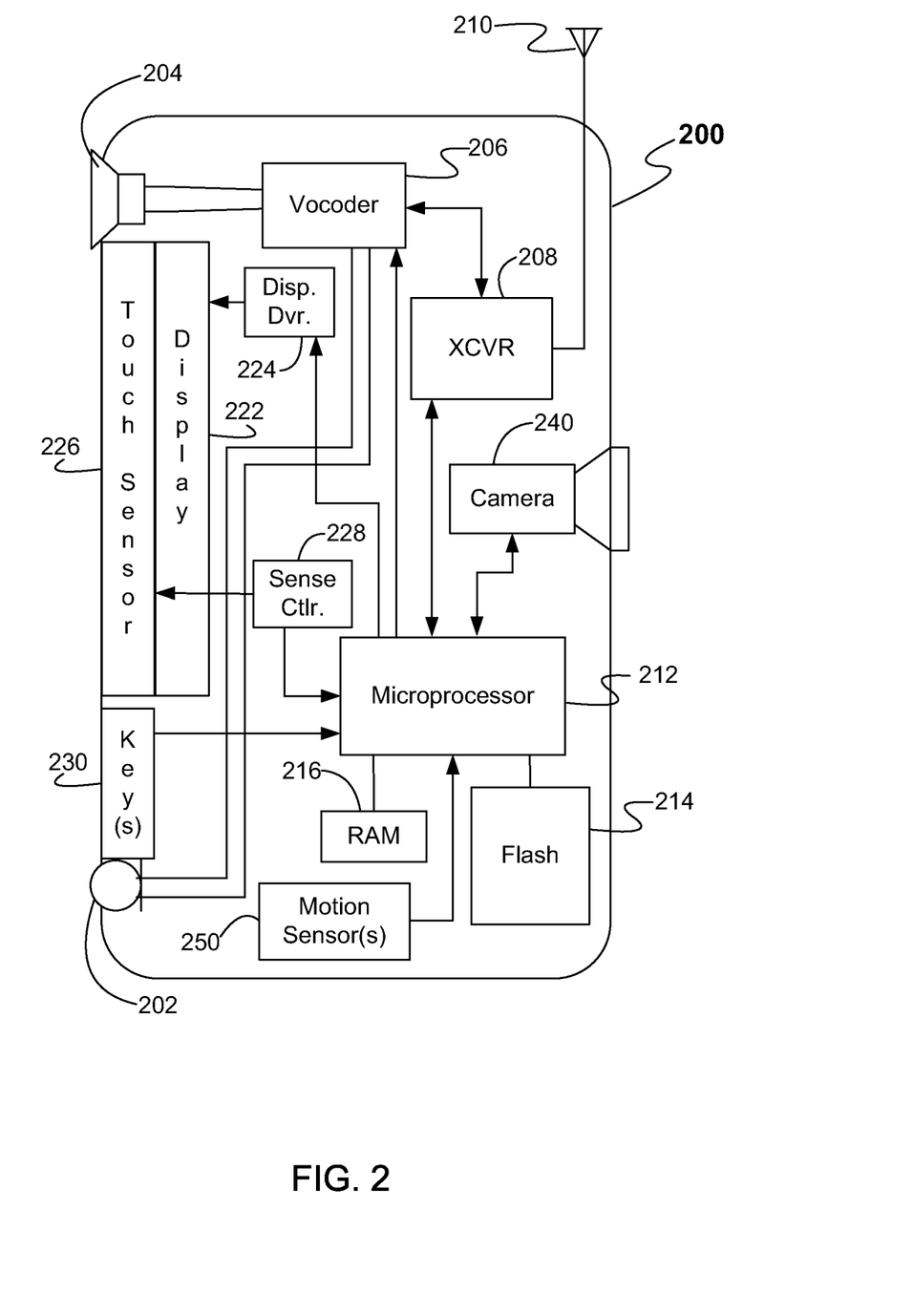
FIG. 2 is a high-level functional block diagram of an example mobile device, according to some aspects of the technology.

FIG. 2. provides a block diagram illustration of an example mobile device 200 having a touch-screen interface. The touch-screen type mobile device 200 includes microphone 202, speaker 204 and vocoder 206, for audio input and output functions. Mobile device 200 also includes at least one digital transceiver (XCVR) 208, for digital wireless communications, although mobile device 200 can include an additional digital or analog transceiver. Transceiver 208 provides two-way wireless communication of information, such as speech information and/or digital information. Transceiver 208 also sends and receives a variety of signaling messages in support of the various voice and data services provided via mobile device 200 and a communication network (not separately shown). Transceiver 208 can connect through radio frequency (RF) to send/receive amplifiers (not separately shown) to antenna 210. Transceiver 208 can also support various types of mobile messaging services, such as short message service (SMS), enhanced messaging service (EMS) and/or multimedia messaging service (MMS).

Microprocessor 212 serves as a programmable controller for mobile device 200, in that it performs functions of mobile device 200 in accord with programming that it executes. Mobile device 200 includes flash type program memory 214, for storage of various program routines and mobile configuration settings. Mobile device 200 may also include a random access memory (RAM) 216 for a working data processing memory. Of course, other storage devices or configurations can be added to or substituted for those in the example. Hence, as outlined above, mobile device 200 includes a processor and programming stored in flash memory 214 that configures the processor so that the mobile device is capable of performing various desired functions such as the detection and sensitivity selection features of the subject technology.

In the example shown in FIG. 2, the user input elements for mobile device 200 include touch-screen 222 (also referred to as "display screen 222" or simply, "display 222") and can further include one or more hardware keys 230. For example, keys 230 may be implemented as a sliding keyboard containing a full alphanumeric keyboard, or may be one or more function keys, such as a home button. In general, touch-screen display 222 of mobile device 200 is used to present information (e.g., text, video, graphics or other content) to the user of the mobile device. Touch-screen 222 may be, for example and without limitation, a capacitive touch-screen display. In operation, touch-screen 222 includes a touch/position sensor 226 for detecting the occurrence and relative location of user input with respect to the viewable area of the display screen. The user input may occur via a user touch interaction between a surface of the touch-screen and the user's finger, stylus or similar type of peripheral device used for user input with the touch-screen. Use of such a touch-screen display as part of the user interface enables a user to interact directly with the information presented on the display.

Accordingly, microprocessor 212 controls display 222 via display driver 224, to present visible outputs to the user. Touch sensor 226 is relatively transparent, so that the user may view the information presented on the display 222. Mobile device 200 can also include sense circuit 228 for sensing signals from elements of touch/position sensor 226 and detecting the occurrence and position of each touch of the screen formed by display 222 and sensor 226. Sense circuit 228 can provide touch information to microprocessor 212, which can correlate that information to the information currently displayed via display 222, to determine the nature of user input via the screen. Display 222 and touch sensor 226 (and possibly one or more keys 230, if included) are the physical elements providing the textual and graphical user interface for mobile device 200. Microphone 202 and speaker 204 can be used as additional user interface elements and for audio input and output.

In the illustrated example of FIG. 2, the mobile device 200 also includes one or more digital cameras, such as digital camera 240, for capturing still images and/or video clips. Although digital camera 240 is shown as an integrated camera of mobile device 200, it should be noted that digital camera 240 may be implemented using an external camera device communicatively coupled to mobile device 200. Moreover, while FIG. 2 shows digital camera 240 as being on the opposite side of the touch-screen (i.e., directed away from the user), mobile device 200 may also include one or more front-facing cameras directed toward the user of the device, and either or both can be used as sensors to detect gestures. Digital camera 240 may be configured to detect a predetermined gesture associated with a context-sensitive functionality for an application program executing at mobile device 200, as described previously. The digital camera 240 supplies a digital representation of area within its view to the microprocessor 212, which processes the representations and detects whether they represent a predetermined gesture. In another example, two or more cameras may be used in combination as a stereoscopic camera to detect predetermined gestures occurring within a predetermined range of distances from mobile device 200.

In this example, mobile device 200 also includes one or more motion sensors, such as motion sensor 250 for detecting motion input from a user. Examples of motion sensors include an accelerometer and/or gyroscope and associated circuitry for signaling microprocessor 212 in response to detected motion input. The detected motion input may include, for example, a change in orientation of the physical device within three-dimensional space, as described above, as well as a determined rate of change in position of the device. In this way, mobile device 200 can use motion sensor 250 to monitor and track the detected motion or physical movement. The tracked motion detected by motion sensor 250 can be used by microprocessor 212 to determine whether the rate of such movement corresponds to a pattern of movement associated with the predetermined physical gesture for invoking the gesture based help functionality described herein. In some implementations, this may include, for example, determining whether the type of motion and detected rate of motion satisfies one or more predetermined threshold parameters associated with the predetermined physical gesture. Such threshold parameters may include, for example and without limitation, a predetermined rate of acceleration of the detected motion and a predetermined time. For example, microprocessor 212 may use the signaling from motion sensor 250 to determine whether the detected motion or physical movement of mobile device 200 exceeds a predetermined threshold rate of speed or acceleration or whether the change in position or orientation caused by the motion/movement of the physical device occurs in a particular direction or along a particular axis in three-dimensional coordinate space.

In some implementations, a touch sense controller (not separately shown) can include one or more of the components discussed above. As will be discussed in further detail below with respect to FIG. 3, the touch sense controller can include microprocessor 212, touch/position sensor 226, sense circuit 228 and/or display driver 224, etc. In certain aspects, signals generated by a user's interaction with touch-screen 222 can be provided to the touch sense controller, and used to determine a mode of interaction between the user and touch-screen 222.

For example, signals resulting from a user's interaction with a surface of touch-screen 222 can be analyzed (e.g., using one or more processors, such as microprocessor 212) to determine the type of user interaction (e.g., gloved or ungloved interaction). In certain aspects, the determination of a mode of user interaction is made by comparing information associated with the user interaction and/or other information collected by mobile device 200 to a heuristic model. The heuristic model can be based on various types of information including capacitive touch profile information, sound profile information and/or various types of data associated with the user and/or mobile device 200. By way of example, the heuristic model can be based on information including but not limited to: time, temperature, location, device movement or speed/velocity pertaining to mobile device 200. Additionally, in some aspects, information pertaining to a user of the device and/or one or more other users of different or similar devices may be used.

It is understood that various different algorithms, processes and/or machine learning techniques may be used to construct (or implement) a model for determining a mode of user touch interaction. Such algorithms and machine learning techniques can include, but are not limited to, implementations utilizing decision trees, neural networks and/or Support Vector Machines (SVM), etc. Using a machine learning approach, the construction of a model can involve the weighting of various factors or parameters on which the model is based. Additionally, outputs or decisions produced from a model can depend on thresholds or boundaries used to differentiate, for example, gloved and ungloved interactions with a touch-screen.

By way of example, one or more factors (e.g., time, temperature, location and/or device movement, etc.) can be provided as inputs to a model, wherein an output can be used to provide an indication as to the mode of the user's interaction with a touch-screen (e.g., gloved or ungloved interaction). In some aspects, providing multiple factors as inputs to the model can result in more accurate results/outputs. For example, providing a model with information regarding capacitive properties of a user's interaction, in addition to information pertaining to an area of contact between the user and the touch-screen, can yield a more accurate result or output as compared with that which may result from only a single input.

By way of example, signals produced by a user's interaction with touch-screen 222 can include signals representing capacitive changes resulting from the user's touch interaction with touch-screen 222. Additional signals can include information associated with sounds generated by the user's touch interaction, and/or a surface area of touch-screen 222 that is contacted during the user's engagement therewith. By comparing signals generated from the user's interaction with touch-screen 222 to a model (e.g., a heuristic model), a type of user interaction (e.g., gloved or ungloved) can be determined. In certain implementations, a high-sensitivity mode can be selected for the touch sense controller if gloved interaction is detected. Similarly, a low-sensitivity mode can be selected if ungloved user interaction is detected. Additionally, in some implementations, a UI of the subject technology can enable a user to manually toggle between sensitivity settings, for example, corresponding with gloved or ungloved modes of user interaction.

By way of example, a user's ungloved interaction with a touch-screen surface may induce large capacitive changes, as compared to those that would be induced if the user were wearing a glove. By analyzing signals corresponding with the user's touch interaction with the touch-screen (e.g., using a heuristic model), the gloved or ungloved mode of the user's interaction may be inferred.

By way of another example, a user's ungloved interaction with a touch-screen surface may occur along a smaller surface area (e.g., a smaller contact area between the screen surface and the user's finger) as compared to user touch interactions in which the user is wearing a glove. As such, the contact area between the user and the touch-screen surface may be used to determine (e.g., using a heuristic model) whether or not the user is wearing a glove.

Additionally, sounds generated by a user's contact with a surface of the touch-screen may vary, depending on whether or not the user is wearing a glove. By way of example, sounds received by one or more microphones of a host device associated with the touch-screen may be used to make a comparative determination as to whether or not the user's touch interaction is performed using a glove. Depending on implementation, one or more of the foregoing types of information may be provided to a heuristic model to make a determination as to whether a particular interaction corresponds with gloved or ungloved user interaction.

Figure 3:
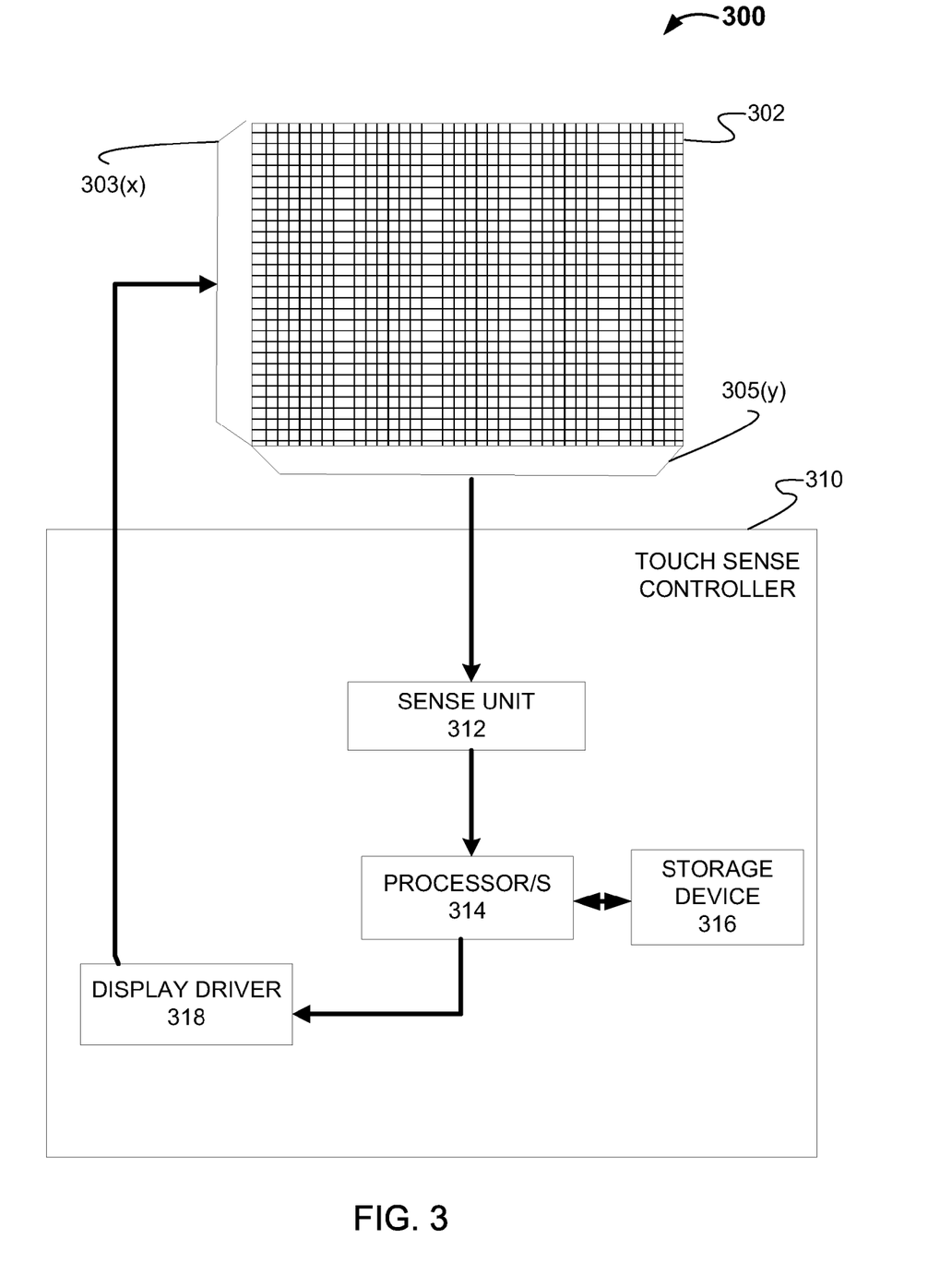
FIG. 3 is a high-level functional block diagram of a touch-screen and a touch sense controller, according to some aspects of the technology.

FIG. 3 conceptually illustrates a block diagram of an example system 300 including a touch sense controller that can be used to implement aspects of the subject technology. Specifically, system 300 includes touch-screen 302 and touch sense controller 310. Touch-screen 302 includes drive electrodes 303(x) and sense electrodes 305(y). Touch sense controller 310 includes sense unit 312, processor/s 314, storage device 316 and display driver 318. As further illustrated, sense electrodes 305(y) are communicatively coupled to sense unit 312, and display driver 318 is communicatively coupled to drive electrodes 303(x).

Storage device 316 can store programming for execution by processor/s 314 and data used in, or resulting from, operations of processor/s 314. For example, storage device can store models and/or data used to determine a mode of user interaction with touch-screen 302. Depending on implementation, touch sense controller 310 can be provided as a single integrated circuit chip such as a general purpose microprocessor, a microcontroller, a programmable logic device/array, an application-specific integrated circuit (ASIC), or a combination thereof. In another example, display driver 318, sense unit 312 and/or processor/s 314 may be provided on separate chips or integrated circuits of touch sense controller 310.

In some implementations, processor/s 314 control display driver 318 to supply drive signals to various drive electrodes 303(x), so as to induce charge on the sense electrodes 305(y) that intersect with the drive electrodes 303(x). Sense unit 312 can detect charge at the various intersections via sense electrodes 305(y), and the sense unit 312 provides measurement signals representing node capacitance to processor/s 314.

Signals representing node capacitance can vary with different types of user interaction with touch-screen 302. For example, capacitive changes induced by the user's interaction with touch-screen 302 may be greater for ungloved interaction, as compared to that of gloved interaction. Similarly, for gloved user interaction with touch-screen 302, the area of contact between the users (gloved) fingers and touch-screen 302 may be larger than the area of contact between the user's fingers and touch-screen 302 for ungloved operation.

Although touch sense controller 310 in FIG. 3 is shown to be only communicatively coupled to touch-screen 302, depending on implementation, touch sense controller may be communicatively coupled to one or more other electronic circuits or modules, for example of a host mobile device, such as mobile device 200.

By way of example, touch sense controller 310 may be configured to received signals or data provided by one or more sensors or memory devices, including but not limited to: motions sensor 250, ram 216, microprocessor 212, flash memory 214, keys 230 and/or camera 240, etc.

Figure 4:
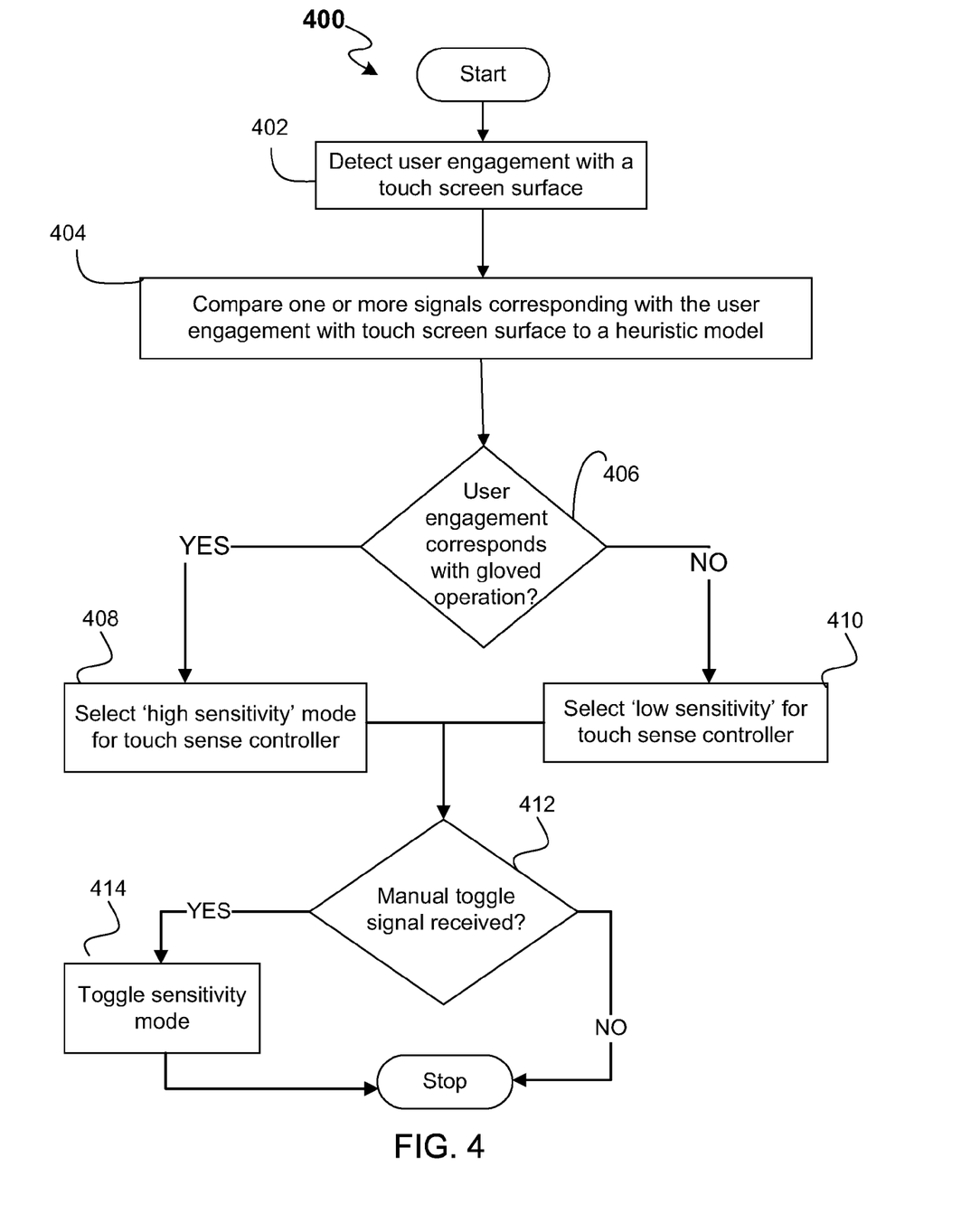
FIG. 4 is a flow diagram of an example process for toggling between a high-sensitivity mode and a low-sensitivity mode, according to some aspects of the technology.

FIG. 4 is a flow diagram of an example process 400 for toggling between a high-sensitivity mode and a low-sensitivity mode, according to some aspects of the technology. Process 400 can begin when software code is executed, for example, by one or more processors of a touch sense controller to perform steps of the subject technology. It is understood that instructions/software for implementing process 400 can reside in one or more of: device drivers, an operating system code and/or application code (e.g., of one or more applications) of a mobile device (e.g., mobile device 200).

The frequency of sensitivity adjustments can depend on implementation. By way of example, determinations as to whether touch-screen sensitivity adjustments are needed can be made each time a user interacts with a device hosting the touch-screen (e.g., a mobile device). In some implementations, sensitivity mode adjustments may be made at fixed time intervals. However, additional factors may also trigger a determination as to whether sensitivity mode adjustments are needed. Such factors can include, but are not limited to, changes in time of day, time of week and/or changes device location.

In some implementations, a touch sense controller can be configured to determine whether sensitivity adjustments are needed based on the occurrence of a particular operation or event that occurs with respect to a mobile device hosting the touch-screen. For example, sensitivity adjustments may be considered every time the touch-screen is transitioned from a powered 'off' to a powered 'on' state. Additionally, sensitivity adjustments may be considered each time the press of a button (or other input) is detected with respect to the mobile device.

By way of further example, the user's interaction with the touch-screen may be periodically checked to determine if any changes in a surface area of engagement have been made. As such, if a user began interacting with a touch-screen using a glove, and then removed the glove during operation, the detected decrease in the user's contact area with the touch-screen may be used to cause a new determination to be made as to whether or not the corresponding sensitivity mode should be updated.

As illustrated, process 400 begins with step 402, in which a user's engagement with a surface of a touch-screen is detected. A user's engagement with a touch screen (e.g., of a mobile device) may be detected when contact between the user and the screen surface causes capacitive changes, for example, at the intersections of sense electrodes (e.g., sense electrodes 305(y)). A user's engagement with a touch-screen can also be detected based on other signals, such as signals indicating user engagement with a physical button, or sound signals indicating a user's engagement with a surface of the touch screen, etc.

In some implementations, a surface area of contact between the user and a surface of the touch screen may be used to infer (e.g., using a heuristic model) whether or not the user is wearing a glove. For example, gloved interactions between a user and the touch screen surface can correspond with greater areas of contact between the user and the screen surface, as compared to ungloved interactions. Thus, an amount of contact area can be used (either alone or in conjunction with other types of information), to infer a mode of user interaction.

In certain aspects, sonic (sound) information may also be used to infer whether the user's interaction is gloved or ungloved. For example, interactions between the user and a touch screen surface will produce different sounds as between a gloved interaction and an ungloved interaction. Thus, a heuristic model based on historic sound information for a particular user (or aggregated for multiple users), and can be used to make a determination of a type of user interaction with respect to a touch-screen surface.

In step 404, one or more signals corresponding with the user's engagement of the touch screen surface are compared to a model, such as, a heuristic model to determine a mode of the user's engagement with the touch-screen (e.g., gloved or ungloved engagement). Heuristic models used to determine a type of user interaction can be based on any available data, such as information specific to a user of the touch-screen, or information aggregated for multiple users, for example, of similar touch-screen type devices.

By way of example, the signals can include various types of information associated with the user's touch interaction, such as, capacitive information representing capacitive changes detected by sense electrodes 305(y). However, signals representing a user engagement with the touch-screen can include other types of information. For example, information regarding a contact area and/or sound information correlated with the user's engagement of the touch-screen may be used to determine whether or not the user is wearing gloves.

In certain aspects, an inference that the user is wearing gloves may be made based on the detection of a relatively larger area of contact between the user's fingers and the surface of the touch screen, for example, because gloved fingers may provide a larger contact area than ungloved fingers. Similarly, sound information associated with the user's engagement can be used to determine whether or not the user is wearing gloves, for example, because gloved contact with a surface of the touch-screen may produce different sounds than that which result from by ungloved interaction.

In some implementations, other types of available information, such as location and/or weather data, may be used to determine whether the user is wearing gloves. For example, if the weather is known to be extremely cold, it may be inferred that the user would likely be wearing gloves while interacting with the touch-screen.

By way of example, weather and/or temperature information may be determined using a sensor (e.g., a thermometer) integrated with a mobile device hosting the touch-screen. In some implementations, weather and/or temperature data may be received by a mobile device hosting the touch-screen from one or more remote servers via a network, such as the Internet and/or a mobile communication network.

In certain aspects, inferences as to the surrounding environment may be made using one or more accelerometers or gyroscopic sensors integrated with a mobile device hosting the touch-screen. For example, accelerometers, gyroscopic sensors and/or a global-positioning system (e.g., a GPS chip) can be used to infer a relative speed of the corresponding mobile device. In some instances, the speed of the mobile device can be used to infer that a user of the device is located within a temperature controlled environment, such as traveling inside of a car, train or airplane, etc. As such, even if the weather associated with a location of the user device is quite cold, the speed of the mobile device may indicate that a user of the device is warm enough to operate the device without gloves, and sensitivity adjustments can be made accordingly.

In step 406, it is decided whether the user's engagement with the touch screen corresponds with gloved or ungloved touch-screen interaction. If it is determined that the user's engagement corresponds with gloved interaction, process 400 proceeds to step 408, in which a 'high sensitivity' mode is selected. Alternatively, if it is determined that the user's engagement corresponds with ungloved interaction, process 400 proceeds to step 410 in which a 'low-sensitivity' mode is selected. High-sensitivity and low-sensitivity modes can correspond to changes in parameters and/or settings with respect to a touch-sense controller (e.g., touch-sense controller 310 described above with respect to FIG. 3). Additionally, high-sensitivity and low-sensitivity modes may be associated with changes in settings/parameters for other portions of the mobile device. By way of example, selection of a high-sensitivity mode may correspond with an increase in voltage supplied to the touch-screen and/or an increase in the amount of signal processing performed by one or more processors, for example, for use in determining user inputs that are received via the touch-screen.

Subsequently, process 400 proceeds to step 412 in which it is determined whether or not a manual toggle signal has been received. In certain aspects, a user interface of the subject technology can provide a feature for allowing a user to manually override automatic sensitivity mode selections. As such, receipt of a manual toggle signal can change the selection of a sensitivity mode selection, for example, from a high-sensitivity mode to a low-sensitivity mode, or vice versa. If a manual toggle signal is received, process 400 can proceed to step 412 in which the sensitivity mode will be changed before process 400 is stopped. Alternatively, if no manual toggle signal is received, process 400 can be stopped.

It is understood that in response to the selection of a particular sensitivity mode, other UI changes can be made. For example, the user experience for a user of a touch-screen of the subject technology may be improved if information displayed on the touch-screen (e.g., icons, text, etc.) were adapted to the mode of user interaction. By way of example, if a high-sensitivity mode is selected for the touch sense controller, then information displayed on the corresponding touch-screen may be enlarged, for example, to account for the inference that the user is engaging with the touch-screen using gloves. Alternatively, if a low-sensitivity mode is selected for the touch-sense controller, the size of displayed objects/information may be reduced, for example, to account for the inference that touch-screen inputs are received via a user's bare hand or stylus type device, etc.

The foregoing discloses systems and methods that can be used to provide a user interface (UI) that is capable of detecting a user's interaction with a touch-screen and determining the type (mode) of the user's interaction (e.g., gloved or ungloved). Aspects of the UI further include features for automatically selecting a sensitivity mode corresponding with the user interaction. For example, aspects of the subject technology can include the automatic selection of a 'high-sensitivity' mode, corresponding with gloved user interaction, and a 'low-sensitivity' mode, corresponding with ungloved user interaction.

Depending on implementation, aspects of the subject technology can be facilitated using a touch sense controller and/or driver software for detecting a mode of user interaction (i.e., gloved or ungloved interaction), and for adjusting sensitivity parameters of a touch-screen, touch sense controller, and/or signal processing circuits/modules of a corresponding host device. The determination as to whether a particular user interaction with a touch-screen occurs with or without a glove can be based on a comparison of a user's interaction with the touch-screen to a model. In certain aspects, the model may be a heuristic model that is based on data collected for a particular user, and/or historical data aggregated for one or more users.

In certain aspects, the subject technology relates to a device, including a touch-screen configured to detect user engagement with a surface of the touch-screen and output one or more signals corresponding with the user touch engagement and a touch sense controller coupled to the touch-screen, wherein the touch sense controller is configured to perform functions, including functions to receive the one or more signals corresponding with the user engagement and determine a mode of user engagement with the surface of the touch-screen based on the one or more signals. In certain aspects, the touch sense controller can be further configured to perform steps for selecting a sensitivity of the touch sense controller relative to the user touch engagement, from among a plurality of sensitivities of the touch sense controller, based on the determined mode of user engagement with the surface of the touch-screen.

In some implementations, the touch sense controller can be further configured to select a high-sensitivity mode associated with the touch-screen, as the selected sensitivity, if the mode of user engagement corresponds with a gloved operation mode. Additionally, the touch sense controller can be further configured to select a low-sensitivity mode associated with the touch-screen, as the selected sensitivity, if the mode of user engagement corresponds with an ungloved operation mode.

In another aspect, the subject technology relates to a method including steps for receiving, at a touch sense controller, one or more signals associated with a user engagement with a touch-screen, determining a mode of user engagement with the touch-screen using the one or more signals and selecting either a high-sensitivity mode or a low-sensitivity mode based on the mode of user engagement with the touch-screen.

In another aspect, the subject technology relates to a touch sense controller, including a sense unit, a storage device, one or more processors coupled to the sense unit and the storage device, wherein the one or more processors are configured to perform operations including receiving one or more signals associated with a user engagement with a touch-screen, determining a mode of user engagement with the touch-screen using the one or more signals, and selecting either a high-sensitivity mode or a low-sensitivity mode based on the mode of user engagement with the touch-screen.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
    a touch-screen configured to detect user touch engagement with a surface of the touch-screen and output one or more signals corresponding with the user touch engagement; and
    a touch sense controller coupled to the touch-screen, wherein the touch sense controller is configured to perform functions, including functions to:
        receive the one or more signals corresponding with the user touch engagement,
        determine a mode of user engagement with the surface of the touch-screen based on the one or more signals and acoustic touch-interaction information, wherein the acoustic touch-interaction information includes information used to distinguish sounds produced in a first mode of user engagement and a second mode of user engagement, and
        select a sensitivity of the touch sense controller, from among a plurality of sensitivities of the touch sense controller, based on the determined mode of user engagement with the surface of the touch-screen.

2. The device of claim 1, wherein the touch sense controller is further configured to select a high-sensitivity mode associated with the touch-screen, as the selected sensitivity, if the mode of user engagement corresponds with a gloved operation mode.

3. The device of claim 1, wherein the touch sense controller is further configured to select a low-sensitivity mode associated with the touch-screen, as the selected sensitivity, if the mode of user engagement corresponds with an ungloved operation mode.

4. The device of claim 1, wherein the function to determine the mode of user engagement with the surface of the touch-screen comprises:
comparing the one or more signals corresponding with the user engagement to a heuristic model of user interaction with the surface of the touch-screen.

5. The device of claim 4, wherein the heuristic model is based on one or more of: capacitive change data, surface area contact data, or acoustic touch-interaction data.

6. The device of claim 4, wherein the heuristic model is based on one or more of: a time, a location, or a motion profile associated with the device.

7. The device of claim 1, wherein the controller is further configured to receive a manual override signal for toggling the touch-screen between a high-sensitivity mode and a low-sensitivity mode.

8. A method, comprising steps of:
receiving, at a touch sense controller, one or more signals associated with a user touch engagement with a touch-screen;
determining, based on acoustic touch-interaction information, a mode of user engagement with the touch-screen using the one or more signals, wherein the acoustic touch-interaction information includes information used to distinguish sounds produced in a first mode of user engagement and a second mode of user engagement; and
selecting either a high-sensitivity mode or a low-sensitivity mode based on the mode of user engagement with the touch-screen.

9. The method of claim 8, wherein the high-sensitivity mode corresponds with a gloved operation mode.

10. The method of claim 8, wherein the low-sensitivity mode corresponds with an ungloved operation mode.

11. The method of claim 8, wherein determining the mode of user engagement with the touch-screen comprises:
comparing the one or more signals corresponding with the user engagement to a heuristic model.

12. The method of claim 8, wherein the heuristic model is based on one or more of: capacitive change data, surface area contact data, or acoustic touch-interaction data.

13. The method of claim 8, wherein the heuristic model is based on one or more of: a time, a location, or a motion profile associated with the touch sense controller.

14. The method of claim 8, further comprising:
receiving, at the touch sense controller, a manual toggle signal; and
selecting between the high-sensitivity mode and the low-sensitivity for the touch sense controller, in response to the manual toggle signal.

15. A touch sense controller, comprising:
a sense unit;
a storage device;
one or more processors coupled to the sense unit and the storage device, wherein the one or more processors are configured to perform operations comprising operations to:
receive one or more signals associated with a user engagement with a touch-screen;
determine, based on acoustic touch-interaction information, a mode of user engagement with the touch-screen using the one or more signals, wherein the acoustic touch-interaction information includes information used to distinguish sounds produced in a first mode of user engagement and a second mode of user engagement; and
select either a high-sensitivity mode or a low-sensitivity mode based on the mode of user engagement with the touch-screen.

16. The touch sense controller of claim 15, wherein the high-sensitivity mode corresponds with a gloved operation mode.

17. The touch sense controller of claim 15, wherein the low-sensitivity mode corresponds with an ungloved operation mode.

18. The touch sense controller of claim 15, wherein determining the mode of user engagement with the touch-screen comprises:
comparing the one or more signals corresponding with the user engagement to a heuristic model.

19. The touch sense controller of claim 18, wherein the heuristic model is based on one or more of: capacitive change data, surface area contact data, or acoustic touch-interaction data.

20. The touch sense controller of claim 18, wherein the operations further comprise:
receiving, at the touch sense controller, a manual toggle signal; and
selecting between the high-sensitivity mode and the low-sensitivity mode for the touch sense controller, in response to the manual toggle signal.

21. The device of claim 1, wherein the first mode of user engagement comprises a gloved operation mode, and wherein the second mode of user engagement comprises an ungloved operation mode.

* * * * *